United States Patent [19]
Spinney et al.

[11] Patent Number: 5,305,306
[45] Date of Patent: Apr. 19, 1994

[54] STATION-TO-STATION FULL DUPLEX COMMUNICATION IN A TOKEN RING LOCAL AREA NETWORK

[75] Inventors: Barry A. Spinney, Wayland; Henry S. Yang, Andover; William R. Hawe, Pepperell, all of Mass.

[73] Assignee: Digital Equipment Corporation, Maynard, Mass.

[21] Appl. No.: 23,741

[22] Filed: Feb. 25, 1993

Related U.S. Application Data

[60] Continuation of Ser. No. 893,217, Jun. 2, 1992, abandoned, which is a division of Ser. No. 468,480, Jan. 22, 1990, Pat. No. 5,155,726.

[51] Int. Cl.⁵ .......................... H04J 3/02; H04L 12/42
[52] U.S. Cl. ........................................ 370/29; 370/85.5
[58] Field of Search ................... 370/85.4, 85.5, 29, 370/31, 24, 85.15; 340/825.05

[56] References Cited

U.S. PATENT DOCUMENTS

| | | | |
|---|---|---|---|
| 4,288,868 | 9/1981 | Grotjohann et al. | 370/30 |
| 4,491,946 | 1/1985 | Kryskow, Jr. et al. | 370/85.4 |
| 4,556,974 | 12/1985 | Kozlik | 370/85.4 |
| 4,649,384 | 3/1987 | Sheafor et al. | 340/825.03 |
| 4,675,671 | 6/1987 | Ishizuka et al. | 370/85.5 |
| 4,764,920 | 8/1988 | Furuya | 370/94 |
| 4,771,417 | 9/1988 | Maxwell et al. | 370/31 |
| 4,841,521 | 6/1989 | Amanda et al. | 370/31 |
| 4,897,831 | 1/1990 | Negi et al. | 370/29 |
| 4,926,418 | 5/1990 | Cidon et al. | 370/85.12 |
| 5,121,382 | 6/1992 | Yang et al. | 370/31 |

FOREIGN PATENT DOCUMENTS

| | | |
|---|---|---|
| 0260470 | 3/1988 | European Pat. Off. . |
| 0364866 | 4/1990 | European Pat. Off. . |
| 3515836 | 7/1985 | Fed. Rep. of Germany . |
| 3415936A | 10/1985 | Fed. Rep. of Germany ........ 370/31 |

OTHER PUBLICATIONS

Tobagi, F., "Multiaccess Protocols in Packet Communications Systems", IEEE Transactions on Communications, vol. Com. 28, No. 4, Apr. 1980, pp. 468–488.

Primary Examiner—Douglas W. Olms
Assistant Examiner—Min Jung
Attorney, Agent, or Firm—Albert P. Cefalo; A. Sidney Johnston; Barry N. Young

[57] ABSTRACT

A technique for establishing and maintaining full duplex communication between two stations connected to a token ring network, without physically reconfiguring the station connections or otherwise disturbing the network. In an auto-configuration full duplex mode of operation, each station ascertains whether there are only two active stations on the network and, if so, performs an exchange of frames with the other station to establish full duplex communication. One way to ascertain whether only two stations are active is for each station to transmit periodically a neighbor information frame, which contains the identities of the source station and the source station's nearest upstream neighbor. Once established, full duplex communication can proceed at a greater bandwidth than communication in a token ring network, and without latency delays and distance limitations associated with token ring networks. Periodic checks are made by each station in full duplex communication, to ascertain if the other station is still participating or if any third station has become active. In either case, stations in the auto-configuration mode revert to token ring mode automatically. In a variant form of the invention, stations can operate in a fixed full duplex mode, in which the detection of tokens or third stations are merely reported and do not necessarily result in reversion to the token ring mode.

4 Claims, 8 Drawing Sheets

FIG. 11a TOKEN | PREAMBLE | SD | FC=TOKEN | ED |

FIG. 11b STAND. FRAME | PREAMBLE | SD | FC=FR TYPE | DA | SA | DATA | FCS | ED | FS |

FIG. 11c NIF FRAME | PREAMBLE | SD | FC=SMT | DA | SA | SMT MSG.(UNA) | FCS | ED | FS |

FIG. 11d REQUEST FDX | PREAMBLE | SD | FC | DA | SA | REQUEST FDX | FCS | ED | FS |

FIG. 11e ACK FDX | PREAMBLE | SD | FC | DA | SA | ACK FDX | FCS | ED | FS |

LEGEND: FOR FIG. 11a - 11e

SD : STARTING DELIMITER

FC : FRAME CONTROL

ED : ENDING DELIMITER

DA : DESTINATION ADDRESS

SA : SOURCE ADDRESS

UNA : UPSTREAM NEIGHBOR ADDRESS

FCS : FRAME CHECK SEQUENCE

FS : FRAME STATUS

FDX : FULL DUPLEX

STATION-TO-STATION FULL DUPLEX COMMUNICATION IN A TOKEN RING LOCAL AREA NETWORK

This application is a continuation of application Ser. No. 07/893,217, filed Jun. 2, 1992 now abandoned, which is a divisional of copending application(s) Ser. No. 07/468,480 filed on Jan. 22, 1990 now U.S. Pat. No. 5,155,726.

BACKGROUND OF THE INVENTION

This invention relates generally to local area networks (LANs) and, more particularly, to LANs operating on a token ring basis and having stations capable of supporting simultaneous, bidirectional communication. In order to understand the problem addressed by the present invention, it is desirable to have a basic understanding of the system architecture and operation of LANs.

A computer network is simply a collection of autonomous computers connected together to permit sharing of hardware and software resources and sharing of information, and to increase overall reliability. The qualifying term "local area" is usually applied to computer networks in which the computers are located in a single building or in nearby buildings, such as on a college campus or at a single corporate site. When the computers are further apart, the terms "wide area network" or "long haul network" are used, but the distinction is one of degree and the definitions sometimes overlap.

The primary function of a LAN is to provide a communication channel of relatively high bandwidth and low latency time, through which computers or stations can communicate with each other. The bandwidth is a measure of the ability of the channel to carry information. For example, a channel may have a total bandwidth of 100 megabits per second (Mbits/s). Because each station on the network has only limited access to the channel, a station will typically be able to use only a fraction of this bandwidth, depending on the number of stations that are active. The latency time is a measure of the time needed to gain access to the communication channel. The bandwidth and latency of a network depend on a number of factors, such as the medium used for the communication channel, the speed of the network, the physical extent and topology of the network, the protocols or rules used to control access to the channel, the number of stations connected to the network, and the message traffic on the channel.

As computer networks have developed, various approaches have been used in the choice of communication medium, network topology, message format, protocols for channel access, and so forth. Some of these approaches have emerged as de facto standards, and a model for network architectures has been proposed and widely accepted. It is known as the International Standards Organization (ISO) Open Systems Interconnection (OSI) reference model. The OSI reference model is not itself a network architecture. Rather it specifies a hierarchy of protocol layers and defines the function of each layer in the network. Each layer in one computer of the network carries on a conversation with the corresponding layer in another computer with which communication is taking place, in accordance with a protocol defining the rules of this communication. In reality, information is transferred down from layer to layer in one computer, then through the channel medium and back up the successive layers of the other computer. However, for purposes of design of the various layers and understanding their functions, it is easier to consider each of the layers as communicating with its counterpart at the same level.

The lowest layer defined by the OSI model is called the physical layer, and is concerned with transmitting raw data bits over the communication channel, and making sure that the data bits are received without error. Design of the physical layer involves issues of electrical, mechanical or optical engineering, depending on the medium used for the communication channel. The layer next to the physical layer is called the data link layer. The main task of the data link layer is to transform the physical layer, which interfaces directly with the channel medium, into a communication link that provides communication services to the next layer above, known as the network layer. The data link layer performs such functions as structuring data into packets or frames, and attaching control information to the packets or frames, such as checksums for error detection, and packet numbers.

Although the data link layer is primarily independent of the nature of the physical transmission medium, certain aspects of the data link layer function are more dependent on the transmission medium. For this reason, the data link layer in some network architectures is divided into two sublayers: a logical link control sublayer, which performs all medium-independent functions of the data link layer, and a media access control (MAC) layer. This layer, or sublayer, determines which station should get access to the communication channel when there is competition for it. The functions of the MAC layer are more likely to be dependent on the nature of the transmission medium.

One common network protocol used to determine bus access priority is the token ring. In a token ring network, a set of stations is serially connected by a transmission medium to form a closed loop. Information is transmitted serially, as a stream of symbols or bits, from one active station to the next. Each station usually regenerates and repeats each symbol and also serves as the means for attaching one or more devices to the ring for the purpose of communicating with other devices on the ring. When a station has access to the ring, it transmits information onto the transmission medium, and the information circulates from one station to the next around the ring. A destination address is contained in the transmitted information, and the addressed station recognizes its address and copies the information as it passes on the ring. Finally, the original transmitting station removes the information from the ring.

A station gains the right to transmit its information onto the medium when it detects a token passing on the medium. The token is a control signal, in the form of a unique symbol that is used to schedule transmission. A station that is ready to transmit information may "capture" the token by removing it from the ring. The station may then send one or more frames of information, followed by the token, which again becomes available for capture by another station.

Typical token ring networks use optical fiber, or coaxial cable, or twisted pair cable as the transmission medium. One such network using the token ring protocol, known as the fiber distributed data interface (FDDI), is intended for operation at a bandwidth of 100 megabits per second (Mbits/s) over distances of several kilometers. The media access control (MAC) protocol for the FDDI token ring system is described in an American National Standards Institute document designated ANSI X3.139-1987. The corresponding physical layer protocol for FDDI is defined in ANSI X3.148-1988.

In addition to the layers defined by these standards, an FDDI token ring network also needs a station management protocol, which provides the control necessary at a station level to manage the various layers, such that a station may work cooperatively as a part of the token network. Station management provides services such as connection management, station insertion in and removal from the network, station initialization, configuration management, collection of statistics, and so forth.

In the station management protocol, there is a mechanism for one station to inform its immediate, i.e. logically adjacent, neighbor station of its unique address. Every station periodically executes a neighbor notification protocol, which uses this mechanism, to allow its immediate, downstream neighbor station to maintain an upstream neighbor address (UNA) database. Thus each station in the network knows the unique address of its immediate upstream neighbor station. The terms "upstream" and "downstream" refer to the direction of flow of the token and data in the network. The neighbor notification protocol requires that each station periodically transmit a neighbor identification frame (NIF), which is destined for the immediate downstream neighbor alone, and no other station. The NIF frame contains the source station's unique address and the upstream neighbor address (UNA) that the source station has learned from its upstream neighbor station.

An obvious limitation of network protocols such as the token ring is that the effective bandwidth available to any one station is reduced when many stations are actively connected to the network. If n stations are active, for a best case with no overhead, the effective bandwidth for each is only 1/nth of the channel bandwidth. Another limitation of the token ring network is that it has significant latency time that increases with the size of the network. Before a station can begin transmitting, it must wait for the token to arrive. If the token has just passed, there will be a delay time while it is passed around the ring from station to station. The average delay time is the time taken to pass the token around one half of the ring, and depends on the distances between the stations, the number of stations and the message traffic on the ring. Even if no other stations are waiting to transmit, the station wishing to send a frame of data will still have to wait for the token to arrive.

There are some applications in which it would be desirable to provide a point-to-point communication link between computers at a relatively high bandwidth and without the inherent limitations of network protocols such as the token ring. Ideally, it would be desirable for these applications to have full duplex communication between two stations. In the token ring network, only one station can transmit at any time. Therefore, although a number of messages may be circulating simultaneously on the ring, operation of the communication channel formed by the ring is effectively in a half duplex mode. Even if only two stations are connected to the ring, only one can transmit at a time, and the total bandwidth of the ring, which may be 100 Mb/s in each direction, is not being utilized.

If two stations connected to the ring are capable of transmitting and receiving at the same time, they are said to be full duplex stations, but they would be incapable of operating in this mode under the conventional token ring protocol. One solution to this problem is to provide a dedicated communication channel between the two computers needing full duplex communication, but this is both costly and inconvenient. Dedication of computer equipment or a communication channel to a narrow range of applications is clearly an inefficient use of equipment resources. Moreover, a computer user desiring full duplex connection with another computer would need additional software to connect with the full duplex channel, and would face no small inconvenience in having to disconnect from the network and reconnect to it after the need for full duplex operation was satisfied. Most users would prefer to retain the convenience of ready access to multiple network resources, and tolerate a less than desirable performance for some applications.

It will be appreciated from the foregoing that there is a need in the area of local area networks for a simple approach that would allow computers connected to a network to communicate in a full duplex mode without permanent dedication of equipment for this purpose, and without the need for complex additional hardware or software. The present invention is directed to a solution to this problem, as will become apparent from the following summary.

SUMMARY OF THE INVENTION

The present invention resides in apparatus, and a related method for its operation, for establishing full duplex communication between two computers connected to a token ring network. Briefly, and in general terms, the method of the invention comprises the steps of ascertaining, in each station implementing the invention in a token ring network, whether only two stations are active in the network; then, if only two stations are active in the network, exchanging signals between the two stations to negotiate the establishment of full duplex communication; and switching to a full duplex mode of communication between the two stations. In the illustrative mode of the invention, the signals exchanged between the two stations are in the form of frames of information.

After switching to the full duplex mode of communication, the invention includes the additional steps of periodically testing in each station to ascertain if the full duplex mode is being maintained by the other station, checking at each station for the presence of a third station wishing to enter the network, and reverting to a token ring mode of operation if the full duplex mode is not being maintained by both stations or upon sensing the presence of a third station.

More specifically, the step of exchanging frames to negotiate the establishment of full duplex communication includes transmitting a full duplex request frame from at least one of the stations, and transmitting a full duplex acknowledgment frame from at least one of the stations after receiving a full duplex request frame. Basically, the negotiation of the full duplex mode involves the transmission of the full duplex request frame by at least one of the stations, and the transmission of the acknowledgment frame by a station receiving the request frame. Once a station has received either a request frame or an acknowledgment frame, the station enters the full duplex mode of operation.

In a preferred embodiment of the invention, the step of ascertaining whether only two stations are active in the network makes use of a neighbor information frame transmitted in token ring networks. A neighbor information frame is transmitted periodically from each station and contains the identity of the station transmitting the frame and the identity, if known, of an upstream neighbor station from which this station has received a neighbor information frame. When a neighbor information frame from an upstream neighbor is received by a station, it contains both the source address from which the information station was transmitted and the identity of the upstream neighbor of the source station. In accordance with this aspect of the invention, detection of a two-station network is effected by comparing the identity of the upstream neighbor station contained in the received neighbor information frame with the identity of the local station in which the comparison is being performed.

In another embodiment of the invention, full duplex operation is initiated without first ascertaining whether only two stations are connected to the network. The method in this embodiment includes the steps of exchanging frames between the two stations to negotiate the establishment of full duplex communication, detecting, as a result of the exchanging step, whether or not full duplex mode can be established, and switching to a full duplex mode of communication between the two stations if the detecting step ascertains that full duplex mode can be established. This method may also include the steps of periodically testing at each station to ascertain if the full duplex mode is being maintained by the other station, and repeating the step of exchanging frames to negotiate the establishment of full duplex mode, if the step of periodically testing ascertains that full duplex mode is not being maintained.

In terms of apparatus, the present invention comprises means for ascertaining, in each station in a token ring network, whether only two stations are active in the network; means, operative if only two stations are active in the network, for exchanging frames between the two stations to negotiate the establishment of full duplex communication; and means for switching to a full duplex mode of communication between the two stations. The apparatus form of the invention may also include means for periodically testing at each station to ascertain if the full duplex mode is being maintained by the other station, and means for checking at each station for the presence of a third station wishing to enter the network. The apparatus reverts to a token ring mode of operation if the full duplex mode is not being maintained by both stations or upon sensing the presence of a third station.

In an alternate apparatus embodiment, a fixed full duplex mode is achieved by exchanging frames to negotiate the start of the mode, without preliminarily checking for a two-station network and without reverting to token ring mode in the event of a third station's presence or cessation of full duplex operation by the other station.

It will be appreciated from the foregoing that the present invention represents a significant advance in the field of local area networks, especially of the token ring type. In particular, the invention provides for automatic establishment of full duplex mode between two stations on a token ring network, and automatic reversion to token ring mode in the event of one station's withdrawal from the full duplex link, or a third station's connection to the network. In a fixed full duplex mode of operation, two stations on a token ring network are connected in full duplex communication, and the connection is maintained, or reestablished if necessary, even upon the detection of additional stations on the ring or failure of one station to maintain the full duplex mode.

The principal advantages of the invention are its high total bandwidth, resulting from an effective doubling of the bandwidth in full duplex operation, a lower latency time for gaining access to the network, and fewer failure modes and error recovery procedures, which are a source of overhead in conventional networks. For example, when operating in full duplex mode no procedure is needed to recover from the loss of a token, since tokens are not used in full duplex mode. Other aspects and advantages of the invention will become apparent from the following more detailed description, taken in conjunction with the accompanying drawings.

BRIEF DESCRIPTION OF THE DRAWINGS

FIGS. 11a–11e are formats of frames used to establish and maintain full duplex operation.

DESCRIPTION OF THE PREFERRED EMBODIMENT

Figure 1:
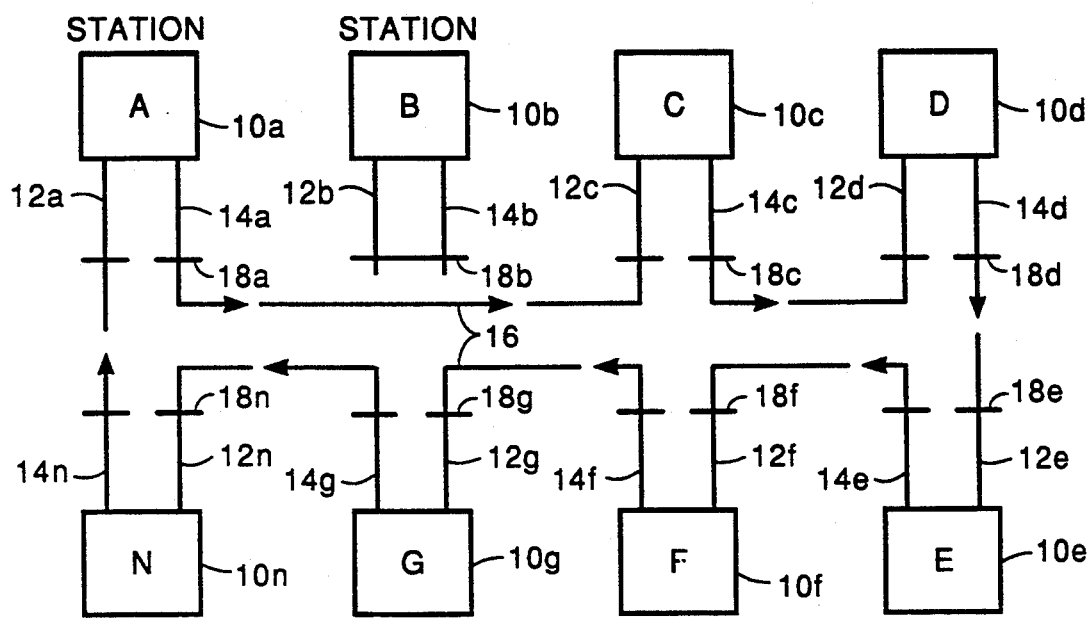
FIG. 1 is a block diagram illustrating the concept of a token ring network.
Figure 1A:
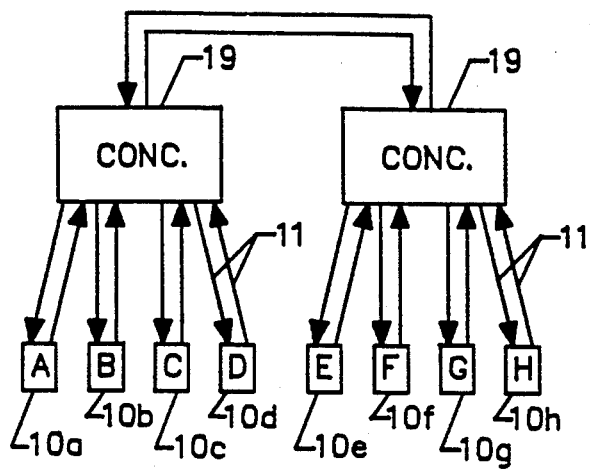
FIG. 1a a is a block diagram corresponding to FIG. 1, but showing a more practical configuration of a token ring network using concentrators.

As shown in the drawings by way of illustration, the present invention is concerned with local area networks (LANs) and particularly with LANs in the form of token ring networks. FIG. 1 shows in conceptual form a token ring network having n stations, eight of which are shown, indicated by reference numerals 10a, 10b, 10c, 10d, 10e, 10f, 10g and 10n. Each station has an input port 12a, 12b and so forth, and an output port 14a, 14b and so forth, and these may be connected to a communication medium 16. Each station has associated with it a bypass switch 18a, 18b and so forth, which may be logically closed to isolate the station from the communication medium 16. Although the concept of a bypass switch associated with each station is a useful one for explaining operation of the network, in practice stations are bypassed in a concentrator. As illustrated in FIG. 1a, the stations 10a, 10b and so forth, are more typically connected to one or more concentrators, two of which are shown at 19, by duplex cables 11. The cables may be, for example, duplex fiber optic cables. The bypass switching action is performed within the concentrators 19.

Stations 10 (FIG. 1) that are not bypassed are connected to the medium 16 to form an unbroken ring. The output port of each station is connected through the medium 16 to the input port of the next station. Thus the ring is completed through all of the active stations. By way of conceptual illustration in FIG. 1, the bypass switch 18b for station 10b is shown as closed, isolating station 10b from the network, and all the other bypass switches 18a, 18c-18n are shown as open.

Information is transmitted around the ring from one station 10 to the next, in the form of a stream of symbols or data bits, and each station generally regenerates or repeats the symbols it receives. Each station 10 has a unique address and may have connected to it multiple user devices (not shown) that require access to the network. An example of the format of a frame of data is shown in FIG. 11b. It includes a preamble, various control codes, the data itself, a destination address uniquely identifying the station and user device to receive the data, and a source address uniquely identifying the station and device sending the data. When a station acquires authority to transmit onto the network, the station transmits information onto the ring in this form. Stations located "downstream" of the originating station receive the information and decode the destination address. The destination station recognizes the destination address and not only retransmits the entire frame, but also copies it as it passes. Finally, when the information has traversed the entire ring, the originating station "removes" it by simply not retransmitting the frame onto the ring. Authority to originate a transmission of information onto the ring is carried in a special symbol referred to as the token. A format for a token is shown in FIG. 11a. The token carries no real data, only a special code that uniquely identifies the frame as the token. The token follows each transmission of information, i.e. one or more frames, and is circulated with the information, but with one important exception. The token may be removed by any station wishing to originate a new transmission. A station with nothing to send will simply repeat every received frame, including the token. A station wishing to transmit its own frame will remove or "capture" the token, to temporarily deny access to downstream stations, and will transmit its own frame or frames onto the ring, ending with the transmission of a new token. A timer or other means may be used to limit the time that a station may use the communication medium before passing the token.

As described in the background section of this specification, the token ring network has an inherent latency time, such that any station wishing to transmit will have to wait until the token is received. This latency time increases with the circumferential length of the ring, the number of stations connected to it, and the amount of message traffic on the ring.

Figure 2:
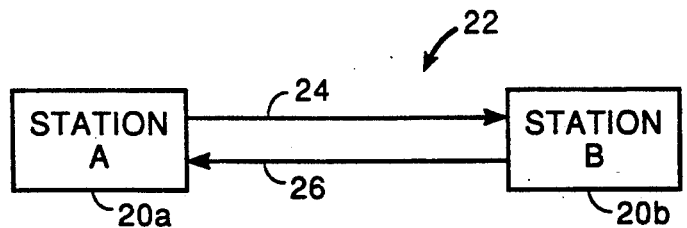
FIG. 2 is a block diagram illustrating physical point-to-point full duplex communication between two stations.

FIG. 2 shows, by way of contrast, two stations 20a, 20b connected together by a duplex cable pair 22, providing physical communication paths 24, 26 in both directions between the two stations. Stations 20a and 20b are physically connected by a full duplex communication path. If the stations themselves are capable of sending and receiving simultaneously, full duplex communication can be established between them. This mode of communication is highly desirable in some situations. Full duplex mode provides a higher bandwidth and completely overcomes any latency delays, since each station may begin transmitting as soon as it has data to send. However, removing stations from a network to physically establish point-to-point full duplex communication is both costly and inconvenient. A simpler approach is therefore needed to provide full duplex communication in a token ring network environment.

Figure 3:
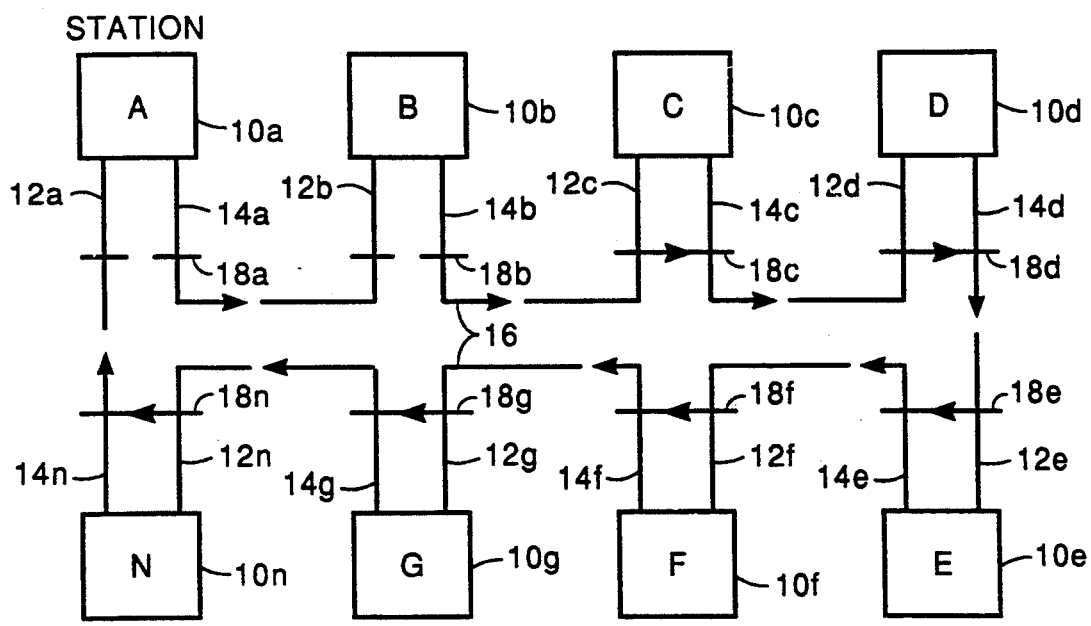
FIG. 3 is a block diagram similar to FIG. 1, showing conceptually how a token ring network might be configured to provide logical point-to-point full duplex communication between two stations.

In accordance with the invention, a token ring network can be automatically reconfigured to operate in full duplex mode without physically reconfiguring the network and without the need for complex additional hardware or software. FIG. 3 shows how the token ring network of FIG. 1 might be logically reconfigured to operate in full duplex mode between two stations 10a and 10b. All of the other stations 10c-10n have their associated bypass switches 18c-18n closed, to isolate the stations from the network. Therefore, the ring medium 16 provides a bidirectional path between the two active stations 10a and 10b. However, if token ring protocols continue to be observed, the configuration shown in FIG. 3 will still not operate in full duplex mode. Only one of the two active stations can have the token at any time. Therefore, only one station can transmit at any time and operation is still only in half duplex mode. As will shortly become apparent, the present invention provides a simple technique for operating the configuration of FIG. 3 in full duplex mode whenever the need arises.

Figure 4:
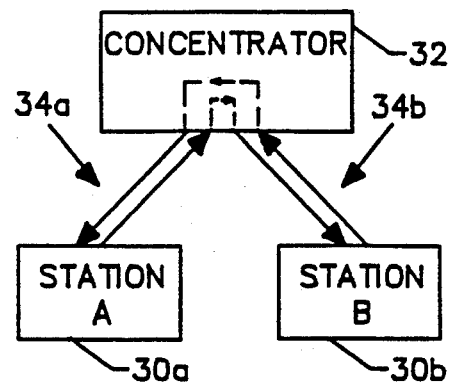
FIG. 4 is a block diagram showing the connection of stations through a concentrator to provide logical point-to-point full duplex communication between the stations.

FIG. 4 is a diagram similar to FIG. 3, but showing two stations 30a, 30b logically connected in full duplex mode through a concentrator 32. Concentrators are used in token ring networks to avoid an inherent weakness of the ring configuration: that a break anywhere in the ring can render the entire network inoperative. As mentioned earlier with reference to FIG. 1a, in a concentrator configuration each station 30a, 30b is connected to the concentrator 32 by its own bidirectional communication channel 34a, 34b. Thus the network has the same apparent topology of a star network, with communication channels radiating out from a central point, but is in fact still a ring network, since the channels 34a, 34b are connected to complete a loop within the concentrator 32. The principle of the present invention applies equally to concentrator configurations like that of FIG. 1a and 4, and to the more easily recognizable ring configuration of FIGS. 1 and 3.

The present invention permits stations on a token ring network to operate in one of three modes: the conventional token ring mode, a full duplex autoconfiguration mode, and a full duplex fixed mode. The full duplex auto-configuration mode allows two stations to negotiate, initialize and synchronize each other in order to operate in the full duplex mode. Operation in full duplex mode can begin only if there are just two active stations on the network. Once the full duplex mode is entered, the stations operating in the full duplex mode will revert to the token ring mode if one of the stations decides to switch to the token ring mode, or if a third station is connected to the network.

Figure 5:
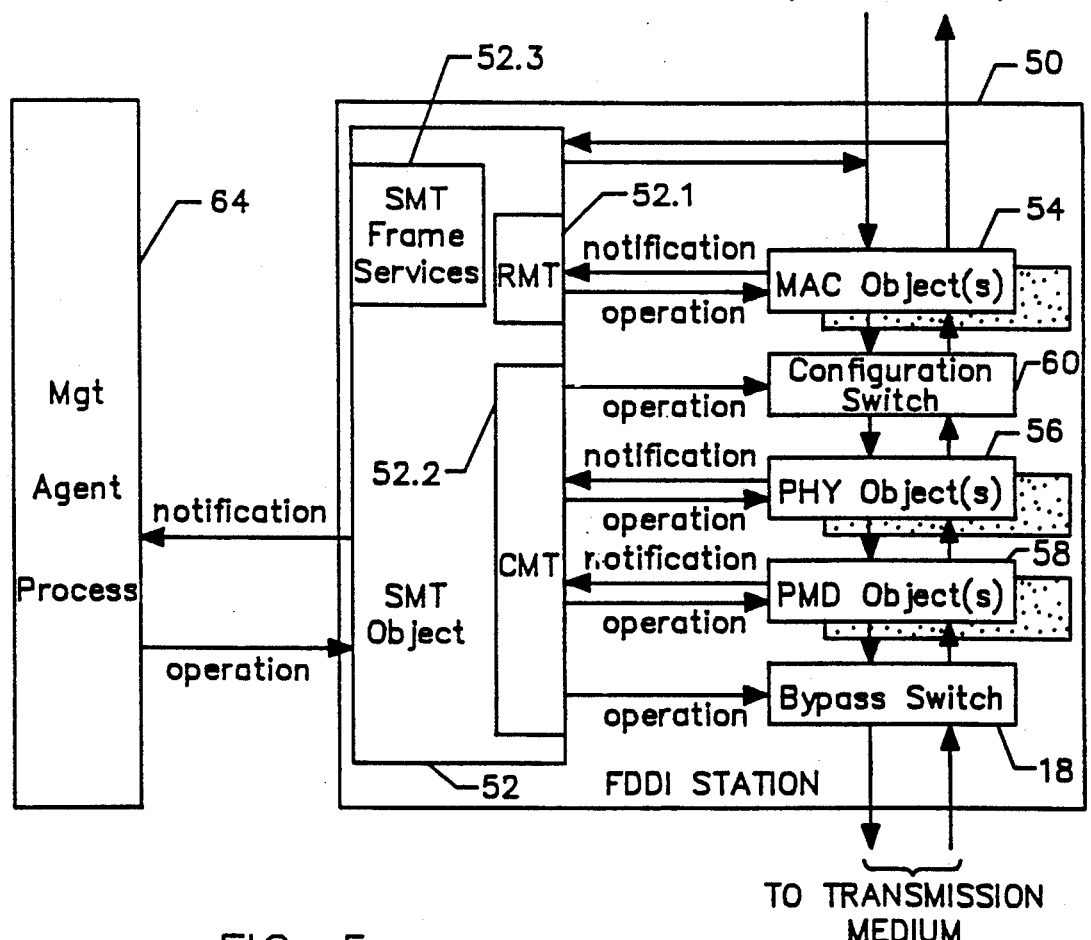
FIG. 5 is a block diagram showing the relationships between a station management protocol and various layers of network architecture.

The functions of the invention now to be described in detail may be integrated into the network architecture in a variety of different ways. As discussed in the background section of this specification, most network architectures are designed in layers conforming in some degree to the International Standards Organization (ISO) Open Systems Interconnection (OSI) reference model. In the (FDDI) network also discussed earlier, there is a station management (SMT) protocol that provides control at a station level to manage operation of the station, including connection management, station insertion and removal, and so forth. Details of the SMT are available in a published draft proposed American National Standard document entitled FDDI Station Management (SMT), designated X3T9.5/84-89, REV. 5.1, Sep. 5, 1989. FIG. 5 shows diagrammatically an FDDI station 50, including a station management (SMT) protocol 52 and some of the lower layers of the network architecture. These include the MAC (media access control) sublayer 54, a physical layer (PHY) 56, and sublayer beneath the physical layer known as the Physical Medium Dependent (PMD) layer 58. These layers are defined in detail in American National Standards ANSI X3.148-1988 and ANSI X3.139-1987.

The Station Management (SMT) entity controls and manages other protocol entities, such as the Media Access Control (MAC) sublayer 54, the physical layer (PHY) 56, the Physical Medium Dependent (PMD) object 58, a configuration switch 60, and the bypass switch 18. Some of the functions and protocols performed by SMT are Ring Management (RMT) 52.1, Connection Management (CMT) 52.2, and SMT Frame Services 52.3. SMT Frame Services include the execution of frame-based protocols, such as the transmission and reception of neighbor information frames (NIFs).

The most convenient way to integrate the functions of the invention into the architecture of a token ring network such as the FDDI, is primarily within the station management protocol 52 and at the MAC sublayer level. However, the invention is not limited to this implementation. For example, it is possible to use a physical-layer-based protocol to ascertain whether or not a two-station configuration exists and whether the two stations are willing to operate in full duplex mode. The connection management (CMT) interface 52.2 in some networks uses physical layer signals to perform link quality tests, exchange topology information, connection type, fault status propagation, and synchronization of the physical link.

In the discussion that follows, it will be assumed that data frames are transmitted and received without error. It will be understood, however, that frames containing detected errors may be ignored or discarded. As will be further described, some frames generated in accordance with the invention will be retransmitted if necessary.

Figure 6:
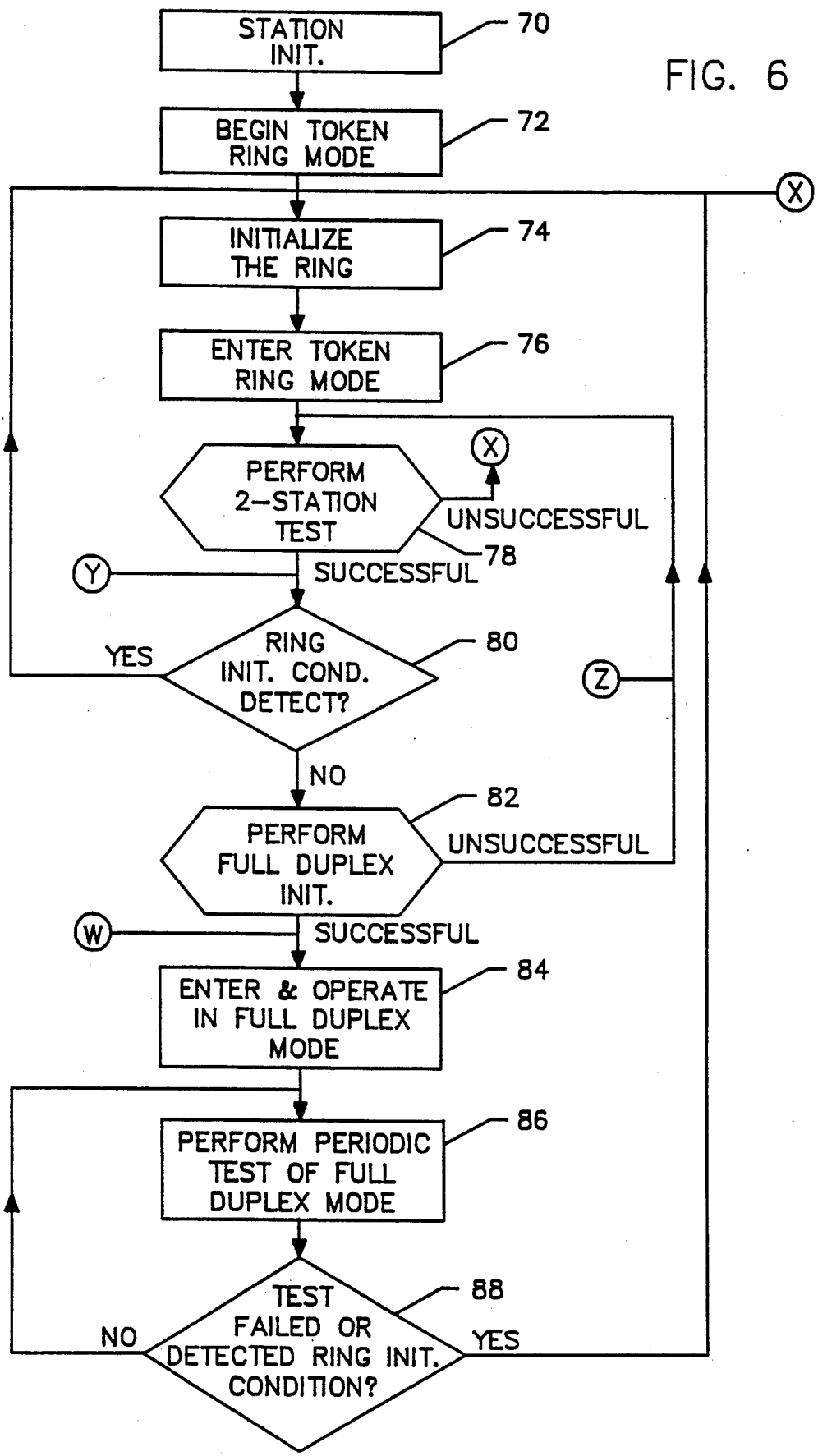
FIG. 6 is a flowchart depicting the functions performed by each station in entering a full duplex auto-configuration mode.

FIG. 6 depicts station functions pertaining to a full duplex auto-configuration mode sequence. First, as shown in block 70, conventional station initialization functions are performed. Then the station begins a conventional series of steps, as indicated at 72, to enter the token ring mode, and the ring is initialized in block 74. Basically, in the FDDI system, token ring initialization includes the "claim token" process, in which each station "bids" for the right to initialize the ring by continuously transmitting claim frames that contain a bid value of a target-token rotation time (TTRT). The upper bound for the token rotation delay for the ring is twice the TTRT time. Generally the lowest TTRT bid wins the right to initialize the ring, but there are prearranged arbitration rules to break a tie between two or more equal bids. The winning station in the claim token process completes initialization of the ring by issuing a token onto the ring. The station is at this point in token ring mode, as indicated at 76.

Next, as indicated in block 78, the station performs a two-station test, to be described in more detail. If the two-station test is unsuccessful in the sense that a different number of stations are detected in the test, the test is repeated until performed successfully. This is not meant to imply that all other processing in the station ceases. The flowchart of FIG. 6 represents only one of many parallel processing paths followed by the station in conformance with the network protocols. If the two-station test detects more than two stations, processing will continue in the token ring mode, but the two-station test will be continually repeated. If the two-station test of block 78 is unsuccessful because of the detection of a ring initialization condition, control is transferred back to block 74, through connector X, to reinitialize the ring.

If the two-station test is successful, an additional test is posed, in block 80, to ascertain whether a ring initialization condition has been detected. In this specification, the term "ring initialization condition" means either: (1) the reception of a ring initialization frame, which may be a claim token frame, a beacon frame, or other frame defined by the token ring protocol being used; (2) the expiration of a token ring protocol timer or the detection of other token ring protocol error conditions; or (3) other implementation-dependent conditions requiring ring initialization.

If a ring initialization condition is detected in block 80, control is returned to the token ring mode initialization steps, at block 74. If no such condition is detected, a full duplex initialization protocol is executed, as indicated in block 82, and will be described in more detail.

If the full duplex initialization protocol of block 82 is unsuccessful, control is transferred back to the two-station test, in block 78, since at this point the full duplex mode has not been initiated and operation in token ring mode may continue until such time as only two stations are detected. If the full duplex initialization is successful, the station enters into and begins operating in full duplex mode, as indicated in block 84.

Once the full duplex mode is entered, a periodic test of full duplex mode is conducted, as indicated in block 86. If the test fails or if a ring initialization condition is detected, as determined in block 88, control is transferred back to block 74 to begin token ring mode initialization again.

In summary, the auto-configuration mode sequence of FIG. 6 brings each station up in the token ring mode; then continually tests to ascertain if only two stations are active. If only two stations are found to be active, the sequence tries to initialize full duplex operation between the two. If successful, the sequence enters its station into full duplex operation, but returns to token ring mode if the full duplex operation ceases or if a third station signals an attempt to reinitialize the token ring.

Figure 7:
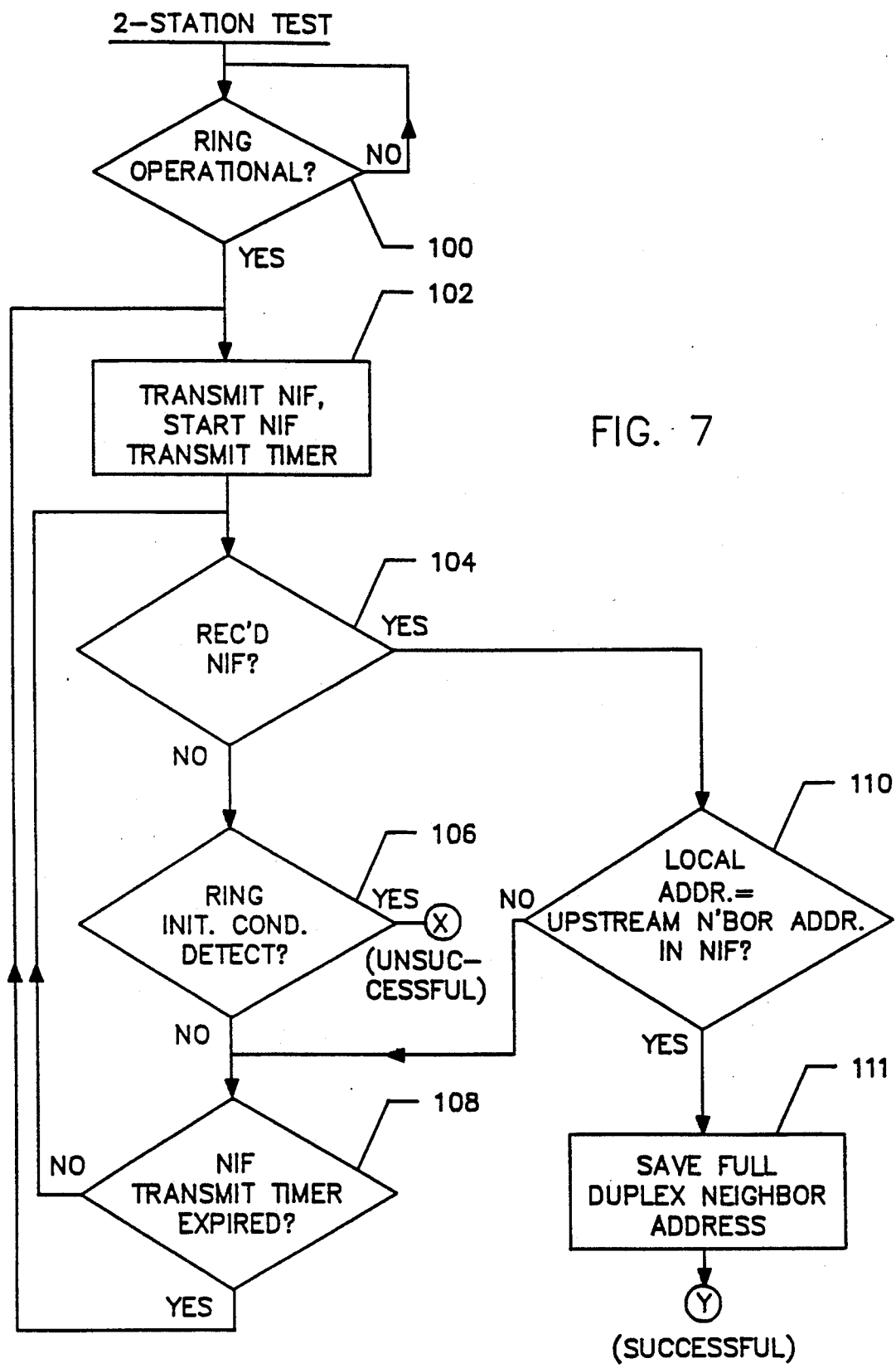
FIG. 7 is a flowchart depicting the functions performed in a two-station test protocol contained within the flowchart of FIG. 6.

FIG. 7 shows in more detail the functions performed in the two-station test 78 of FIG. 6. First, in block 100, performance of the test is delayed until the ring is operational, as indicated by an internal flag in each station. If the ring is operational, a neighbor information frame (NIF) is transmitted, as indicated in block 102 and an NIF transmit timer is started, to set a maximum time for which another NIF would be transmitted. For example, the NIF transmit timer might be set to 30 seconds. In the next sequential block, at 104, it is determined whether an NIF has been received at this station. If not, the next block, at 106, determines if a ring initialization condition has been detected. If so, the "unsuccessful" exit is taken, through connector X, and the ring is reinitialized, in block 74 (FIG. 6). If no NIF frame has been received and no ring initialization condition has been detected, the next question posed is whether the NIF transmit timer has expired, as indicated in block 108. If it has not, control is transferred back to block 104, to check whether an NIF has been received. If the timer has expired, control is transferred back to block 102 and a new NIF is transmitted. It will be seen from these described steps that the station sends an NIF every 30 seconds, for example, depending on the timer value used, and continually checks for the receipt of an NIF from another station. The format of these NIFs is shown in FIG. 11c. Each NIF is transmitted under the token ring protocol, i.e. the station sending the NIF has to wait for a token before sending the NIF. The NIF differs from ordinary data frames in that the destination station may not be known. The destination address can be specified as a "broadcast" address, for any station to receive, and the frame can be specified as for "next station addressing," which means that only the next downstream station will receive it. NIFs can be put to a number of uses, such as generation of a ring map in each station, and duplicate address detection. Stations may be required to send an NIF response directed specifically to the source address of an NIF request. This provides each station with information about its downstream neighbor. In the present invention the NIF is used to obtain the identity of the upstream neighbor of the source station, i.e. the upstream neighbor of the upstream neighbor.

When a received NIF is detected in block 104, its message field is examined to determine whether the upstream neighbor address (UNA) is the same as the address of this station, as indicated in block 110. As shown in FIG. 11c, the NIF includes a source address, identifying the station that transmitted the frame, and a message field that includes the address of the upstream neighbor (UNA) of the source station. If the upstream neighbor address of the source of the received NIF is the same as the address of the local station in which this protocol is being executed, then there must be only two stations on the ring. For example, if only stations #2 and #4 are connected to the ring and they both send NIF frames, the frame received by station #2 will show the source address as station #4 and the UNA as station #2, its own address. Upon detection of a two-station configuration in block 110, the full duplex neighbor address, obtained from the source address in the NIF, is saved, as in block 111, and the "successful" exit is taken from this set of processing steps, through connector Y.

Figure 8A:
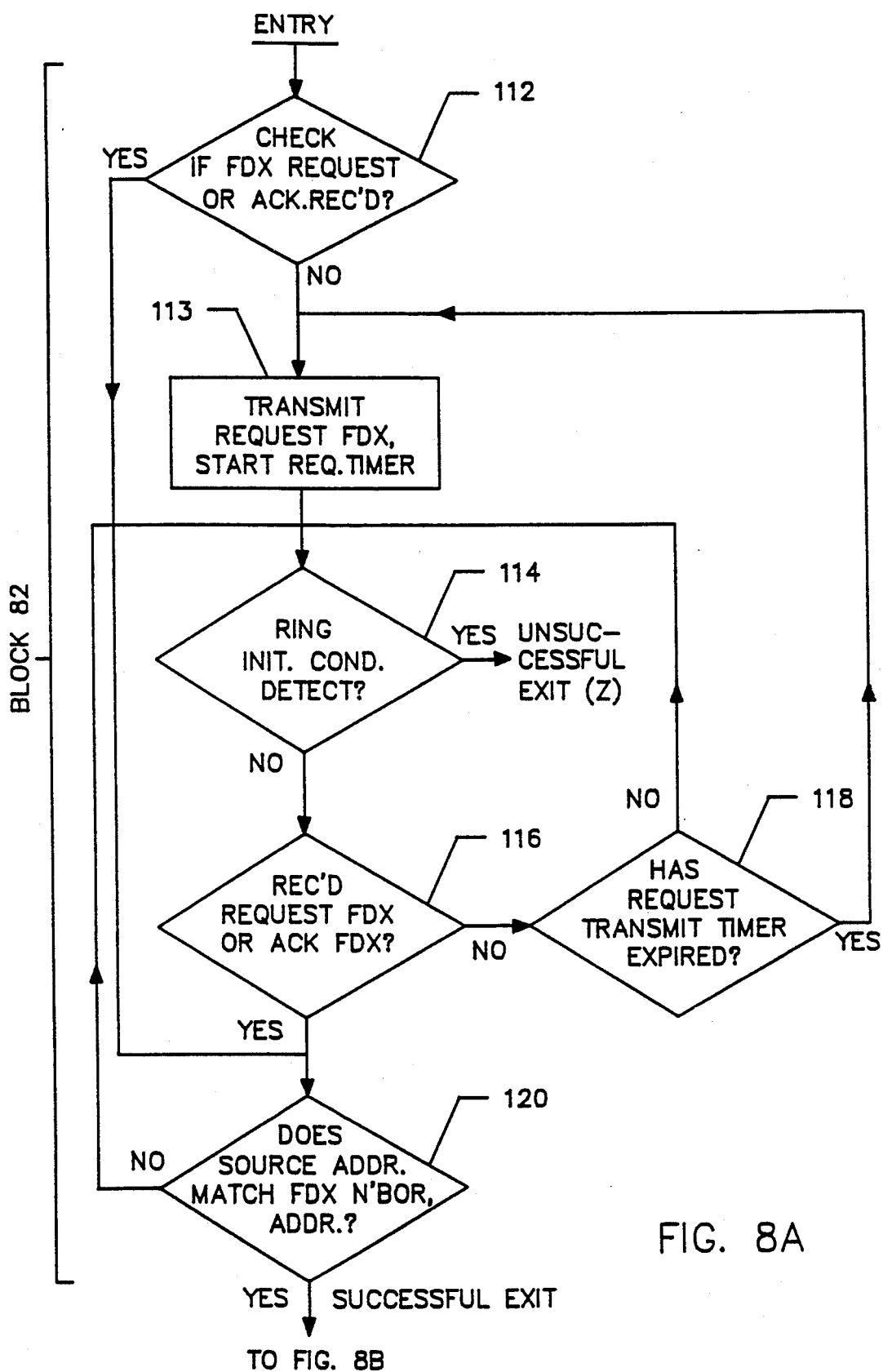
FIGS. 8A and 8B are flowcharts depicting the functions performed in an initialization protocol and periodic testing contained within the flowchart of FIG. 6.
Figure 8B:
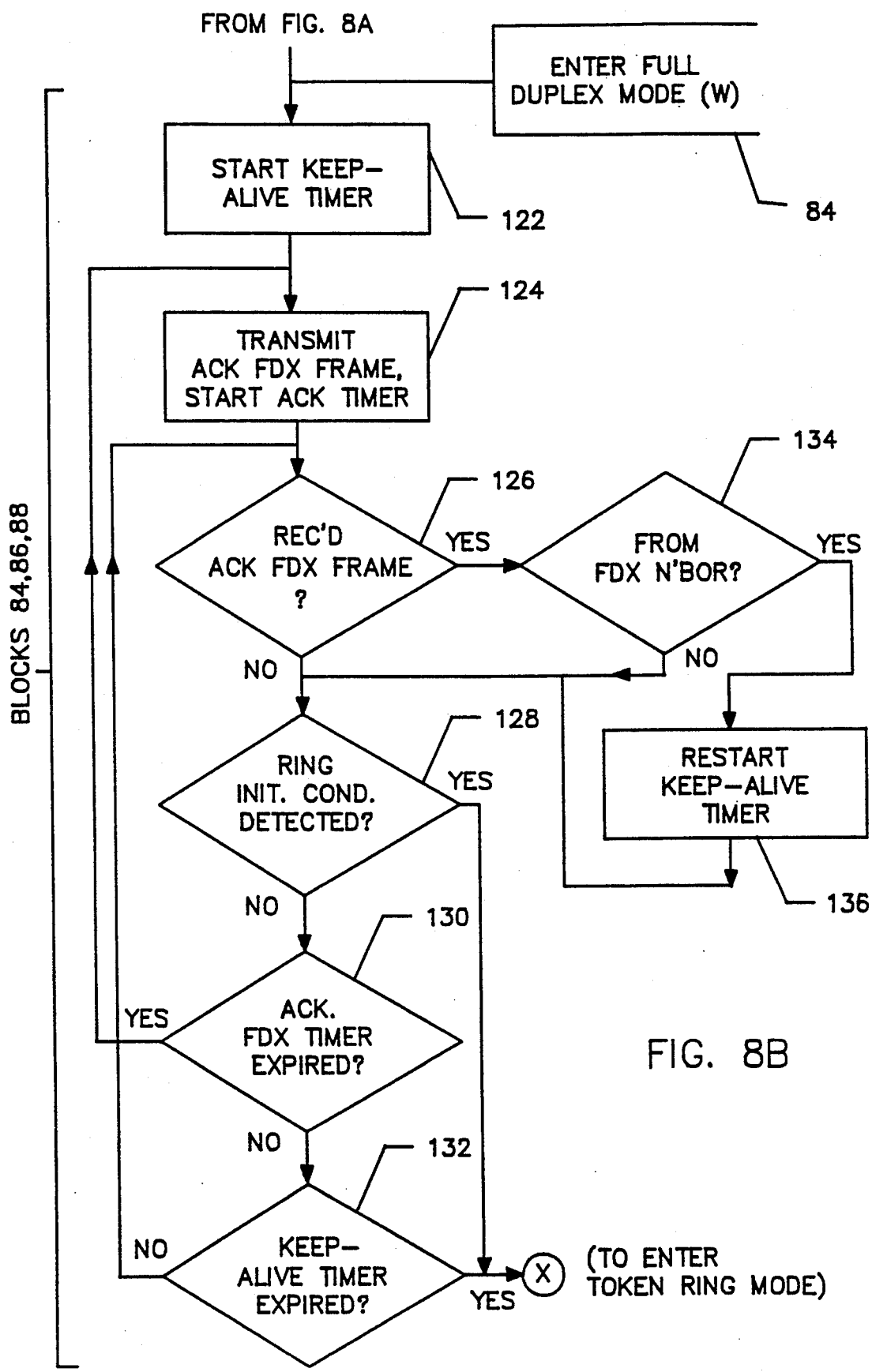

The full duplex initialization protocol of block 82 in FIG. 6 is shown in detail in FIG. 8, together with more detail of the processing blocks 84, 86 and 88, relating to periodic testing of the full duplex mode. In particular, processing blocks 112 through 120 depict the full duplex initialization of block 82 in more detail, and processing blocks 122 through 136 show more detail of blocks 84, 86 and 88 in more detail.

First, as indicated in block 112, a check is made to determine if a request FDX or an ACK FDX (acknowledge full duplex) frame has been received. The "handshake" performed by the two stations in establishing full duplex operation involves the exchange of request FDX and acknowledge FDX frames. Each station will independently and asynchronously ascertain that a two-station configuration exists, and, depending on their relative timing, one or both of them will send a request FDX frame. A typical timing diagram of this frame exchange will be discussed with reference to FIG. 10. For purposes of discussion of the processing steps followed in FIG. 8, it will first be assumed that no incoming request of ACK FDX frame has been received.

The next step, shown in block 113, is to transmit a request FDX and to start a request transmit timer. Then, in block 114, a check is made to determine if a ring initialization condition has been detected. If so, full duplex operation is temporarily abandoned and an "unsuccessful" exit is taken, through connector Z to block 78, where the two-station test is repeated. Next, in block 116, a check is made to determine if a request FDX frame or an acknowledgment frame, ACK FDX frame, has been received. If not, a check is made in block 118 to determine whether the request transmit timer has expired. If the request transmit timer has not expired, control is transferred back to block 114, to continue waiting for an incoming frame. If the timer has expired, control is transferred back to block 113 to send another request FDX frame. The value set in this timer is typically a few seconds. Thus, every few seconds a request FDX frame will be transmitted, and there will be continual monitoring for the receipt of an acknowledgment frame or a request frame from the other station.

If a request FDX or an ACK FDX frame is received, as detected in block 116, the next step, indicated in block 120, is to compare the source address of the received frame with the address of the FDX neighbor saved in block 111 of FIG. 7. If there is a match, full duplex communication can be initiated, as indicated at 84, but a further periodic exchange of frames is required to sustain operation in the full duplex mode. As indicated in block 122, an FDX keep-alive timer is started, and, in block 124, an ACK FDX frame is transmitted and an ACK transmit timer is started. The ACK transmit timer typically will be reset with the same value as the request transmit timer, i.e. a few seconds, and will be used to initiate retransmission of the ACK FDX frame every few seconds. The keep-alive timer will typically take a longer period to expire; for example 10–12 seconds.

In block 126, after transmitting the ACK FDX frame in block 124, a check is made for the receipt of an ACK FDX frame. If none has been received, a further check is made for the detection of a ring initialization condition (in block 128), and if one has been received, control is transferred back to initialize the token ring mode (through flowchart connector X to block 74 of FIG. 6). If no ring initialization condition has been detected at this point, the ACK transmit timer is checked, in block 130. If this timer has expired, control is transferred back to block 124 to transmit another ACK FDX frame. If the ACK transmit timer has not expired, the keep-alive timer is checked, in block 132. If it has expired, the token ring mode is initialized again, by transferring control to block 74 of FIG. 6 (through flowchart connector X).

When an ACK FDX frame is received, as detected in block 126, the source address is compared with the saved FDX neighbor address, in block 134. If there is a match, the FDX keep-alive timer is restarted, in block 136, and control is transferred to block 128, to check for a ring initialization condition and, in subsequent block 130, to determine whether the ACK transmit timer has expired. Basically, during operation in the full duplex mode each station sends periodic ACK FDX frames, and continually checks for the receipt of an ACK FDX frame from the other station. If no ACK FDX frame is received during a preselected time interval, such as 12 seconds, it is assumed that full duplex communications are to be discontinued.

Figure 10:
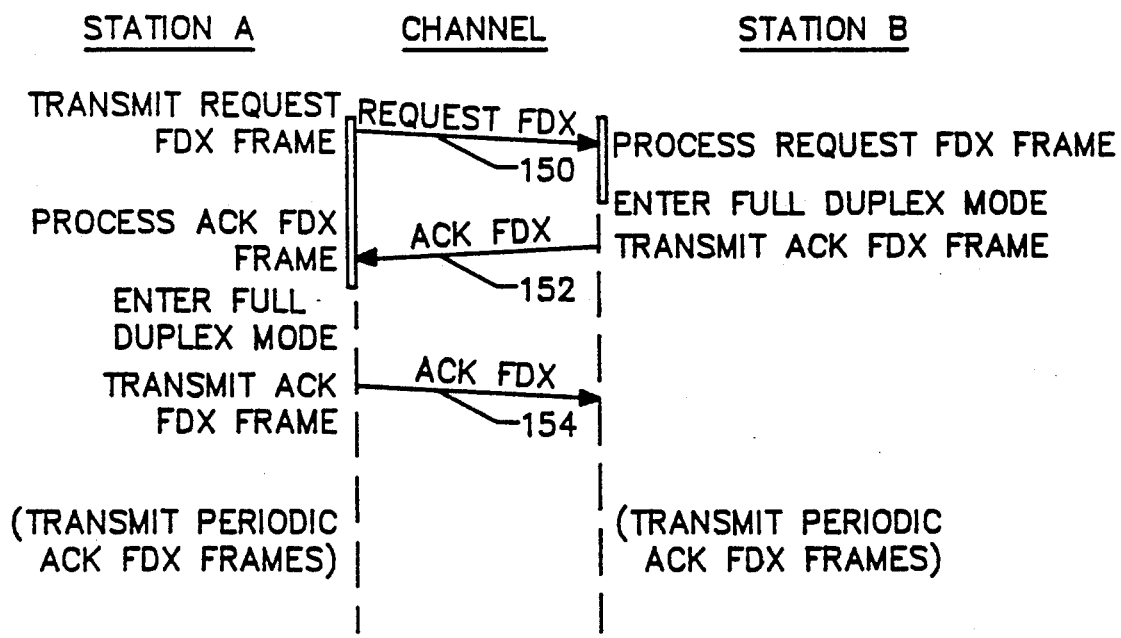
FIG. 10 is a timing diagram showing an exchange of frames between two stations during performance of the full duplex initialization protocol.

A typical sequence of operations of the full duplex initialization protocol is shown in FIG. 10. It is assumed that station A is first to discover that there are only two stations on the ring, and to send a request FDX frame, as indicated at 150. Station B receives the request FDX frame, recognizes it to be from its only neighbor, enters full duplex mode, and transmits an ACK FDX frame, as indicated at 152. Station A, meanwhile, has been waiting the return of an ACK FDX frame. On receiving it, station A also enters full duplex mode, and transmits back another ACK FDX frame, as indicated at 154. Thereafter, both stations are in the full duplex mode and continue transmitting periodic ACK FDX frames to maintain full duplex operation.

Figure 9:
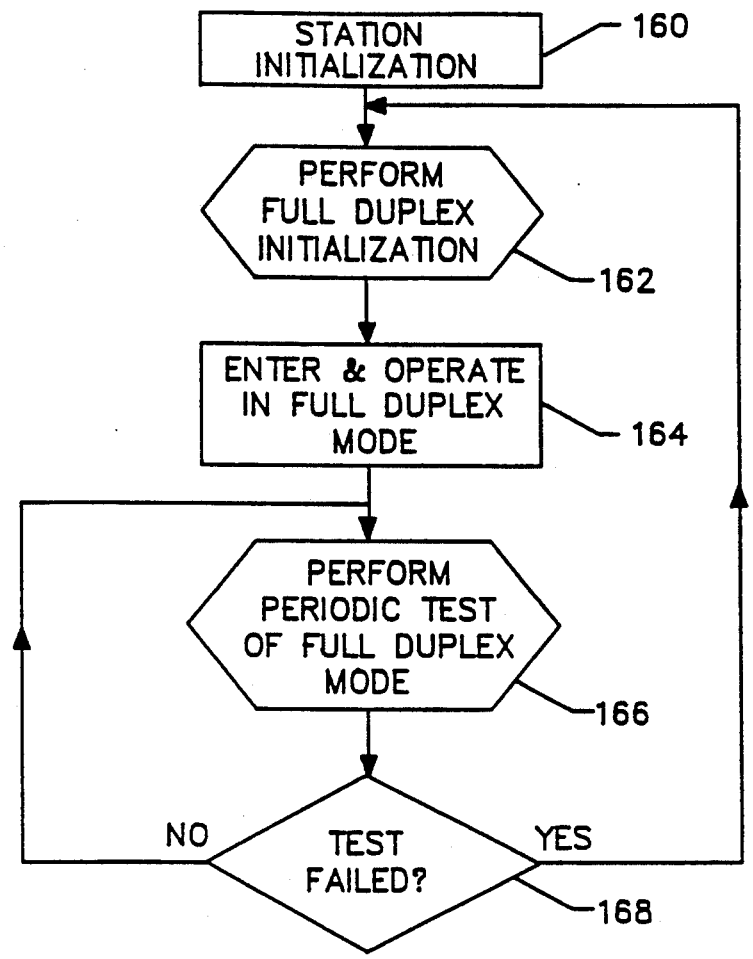
FIG. 9 is a flowchart depicting the functions performed in establishing a full duplex fixed mode or operation.

In another embodiment of the invention, full duplex stations may attempt to enter full duplex mode immediately upon station initialization, as shown in the flowchart of FIG. 9. This may be referred to as the full duplex fixed mode sequence of operations. After station initialization, indicated at 160, each station performs a full duplex initialization sequence, as indicated in block 162. This is basically the same as the initialization depicted in FIG. 8, except that no "unsuccessful" exit is contemplated and no return to token ring mode is made. Moreover, no check is made for the presence of only two stations. After the successful exchange of request FDX and ACK FDX frames in the initialization phase in block 162, the full duplex mode is entered, as indicated in block 164. Optionally, a periodic test of full duplex operation is performed, as shown in block 166. If the test is failed, as ascertained in block 168, the process is started over with another attempt at full duplex operation, in block 162. If the test is passed, operation continues in the full duplex mode, and the test is repeated periodically. For the fixed full duplex mode, various embodiments of the invention are possible, resulting in various degrees of adaptability of the "fixed" mode. The principal design issues here are whether and when to return to the token ring mode. Periodic testing of the full duplex mode may be omitted altogether, or may be included. If it is included, expiration of the keep-alive timer may result in return to the token ring, or a return to attempt full duplex initialization, with possible reporting or logging of the event. Similarly, the "fixed" mode may include continual checking for a ring initialization condition, with reversion to token ring mode (the preferred method) or reporting of the event, or disconnection from the network, or may omit this check altogether.

When two stations operate in full duplex mode, the communication channel is immediately available to either station wishing to transmit. Clearly, this mode of operation is simpler from the standpoint of the communication services that have to control station access to the transmission medium. In most network architectures, these communication services are provided by data link layer protocols and, in the case of the FDDI token ring network, by the media access control (MAC) sublayer of the data link layer. In normal token ring operation, part of the MAC sublayer has to observe the token ring protocols, waiting until a token can be captured from the ring before a transmission may be sent. In full duplex mode, this MAC task is simplified, since no token is needed for transmission. Once a decision has been reached by a station to switch to the full duplex mode, the transition can be simply made by setting an appropriate control flag in the MAC entity. When this flag is set, the MAC protocols are effectively simplified to the full duplex mode, and tokens are ignored. To initiate operation in full duplex mode, the MAC protocol for the station has only to wait until there is no transmission activity at the station (a transmit-idle state), and then make the change to full duplex. Even though the other station may not have quite completed its transition to full duplex mode, this procedure provides a simple and convenient transition. An alternative would be to wait for the token to arrive, and then to provide for a further "handshake" between the MAC entities of the two stations, to try to ensure that no full duplex transmission is made until the other station is ready to receive it. This further level of complexity is not believed to be necessary since, as is conventional, there are various levels of error detection and recovery in the event of lost or erroneous transmissions.

To summarize, the present invention operates to establish and maintain full duplex communication automatically and transparently to the user of the data link layer. That is to say, protocol layers above the data link layer, including the network layer and higher layers, are not affected by the automatic transition to full duplex operation, except to the extent that they benefit in performance. The same frame format is used for data transmission in the full duplex mode as in the token ring mode. Moreover, operation in full duplex mode is also transparent to the physical layer, which needs no modification for the invention to operate. Although a fixed full duplex mode is available using the principles of the invention, the preferred approach is to use the auto-configuration full duplex mode, in which any two stations will automatically discover that full duplex operation is possible, and will automatically negotiate for and enter into the full duplex mode. Return to the token ring mode is also automatic, upon the detection of a third station, or when one of the full duplex stations fails to maintain the full duplex data link, which requires periodic acknowledgment frames to be sent by both stations.

From the foregoing, it will be appreciated that the present invention represents a significant advance in the field of local area networks. In particular, the invention provides for automatic full duplex operation of two stations connected to a token ring network, when no other stations are active in the network. It will also be appreciated that, although a number of embodiments of the invention have been described in detail for purposes of illustration, various modifications may be made without departing from the spirit and scope of the invention. Accordingly, the invention is not to be limited except as by the appended claims.

We claim:

1. A method for establishing and maintaining full duplex operation between two stations in a token ring network, the method comprising the steps of:
- ascertaining, in each station in a token ring network, whether only two stations are active in the network;
- if only two stations are active in the network, exchanging frames between the two stations to negotiate the establishment of full duplex communication;
- switching to a full duplex mode of communication between the two stations;
- and the step of exchanging frames to negotiate the establishment of full duplex communication includes
   - transmitting a full duplex request frame from at least one of the stations, and
   - transmitting a full duplex acknowledgement frame in response to receipt of a full duplex request frame;
- and the step of switching to full duplex mode is initiated in each station upon the receipt of a full duplex request frame or a full duplex acknowledgement frame.

2. A method as in claim 1, further comprising:
- after switching to a full duplex mode of communication, the additional steps of,
   - entering an idle state upon sensing an absence of frames for transmission; and
   - exiting the idle state and transmitting data when frames are ready to be transmitted.

3. Apparatus for establishing and maintaining full duplex operation between two stations in a token ring network, the apparatus comprising:
- means for ascertaining, in each station in a token ring network, whether only two stations are active in the network;
- means, operative if only two stations are active in the network, for exchanging frames between the two stations to negotiate the establishment of full duplex communication;
- means for switching to a full duplex mode of communication between the two stations; and
- the means for exchanging frames to negotiate the establishment of full duplex communication includes
   - means for transmitting a full duplex request frame from at least one of the stations, and
   - means for transmitting a full duplex acknowledgment frame in response to receipt of a full duplex request frame;
- and the means for switching to full duplex mode is activated in each station upon the receipt of a full duplex request frame or upon the receipt of a full duplex acknowledgment frame.

4. The apparatus as in claim 3, further comprising:
- means for entering an idle state upon sensing an absence of frames for transmission after switching to full duplex mode; and
- means for exiting the idle state and transmitting data when frames are ready to be transmitted after switching to the full duplex mode.

* * * * *